(No Model.)  3 Sheets—Sheet 1.
D. D. CATTANACH.
APPARATUS FOR THE MANUFACTURE AND DISTILLATION OF ALCOHOL, HYDROCARBONS, AND ACETIC ACID, AND FOR AGING AND REFINING LIQUORS.
No. 326,716. Patented Sept. 22, 1885.
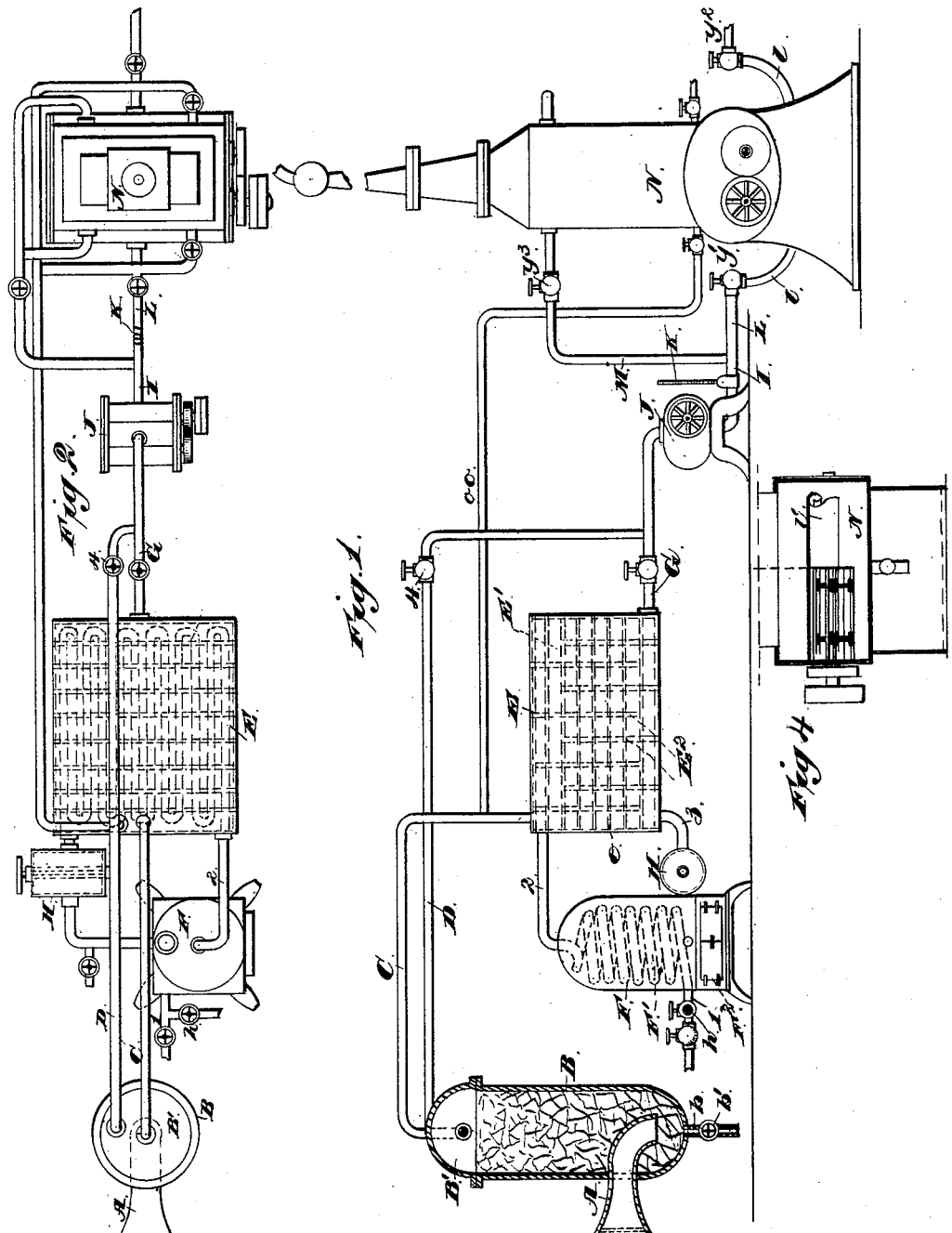

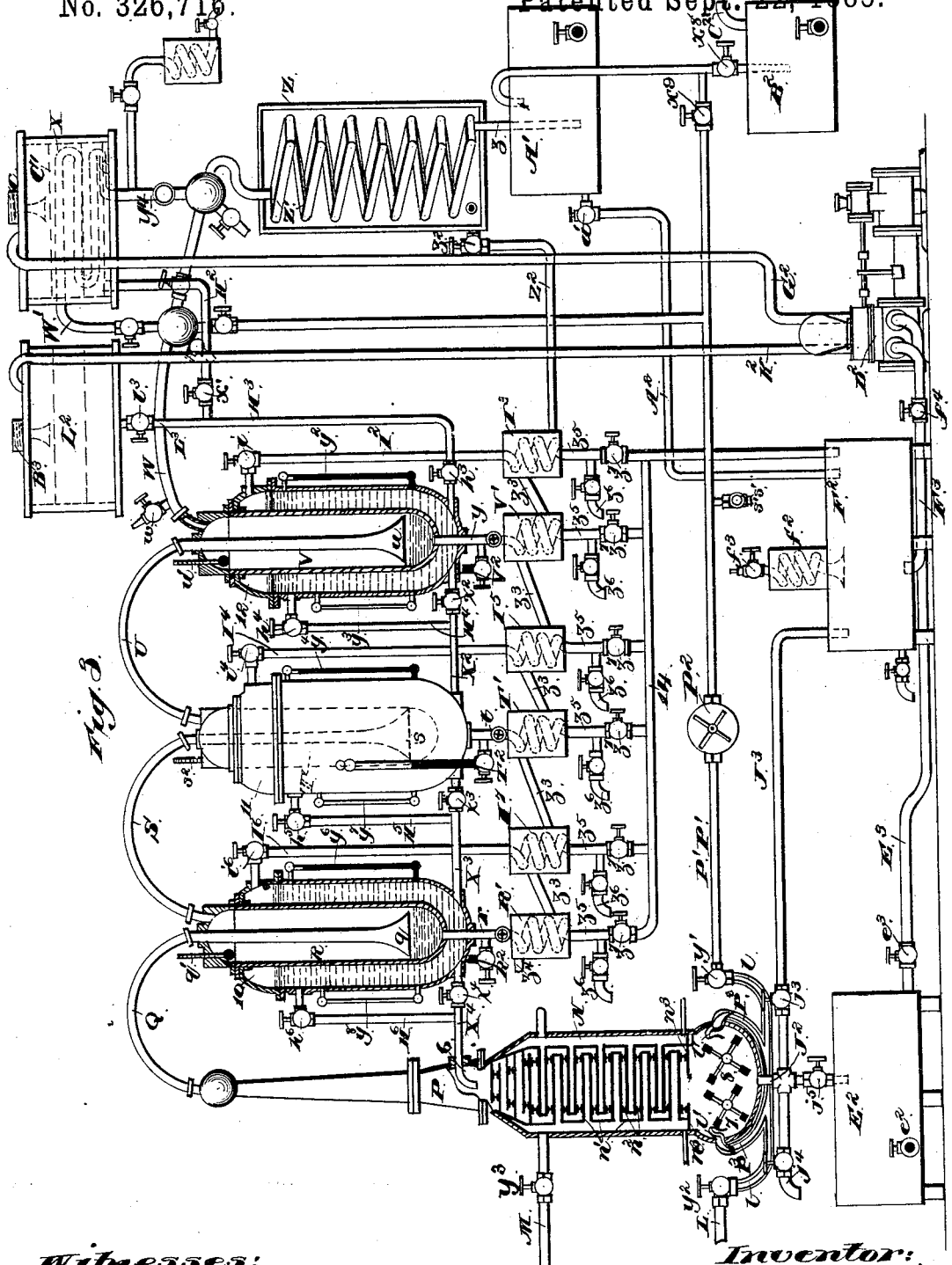

(No Model.) 3 Sheets—Sheet 3.
D. D. CATTANACH.
APPARATUS FOR THE MANUFACTURE AND DISTILLATION OF ALCOHOL, HYDROCARBONS, AND ACETIC ACID, AND FOR AGING AND REFINING LIQUORS.
No. 326,716. Patented Sept. 22, 1885.
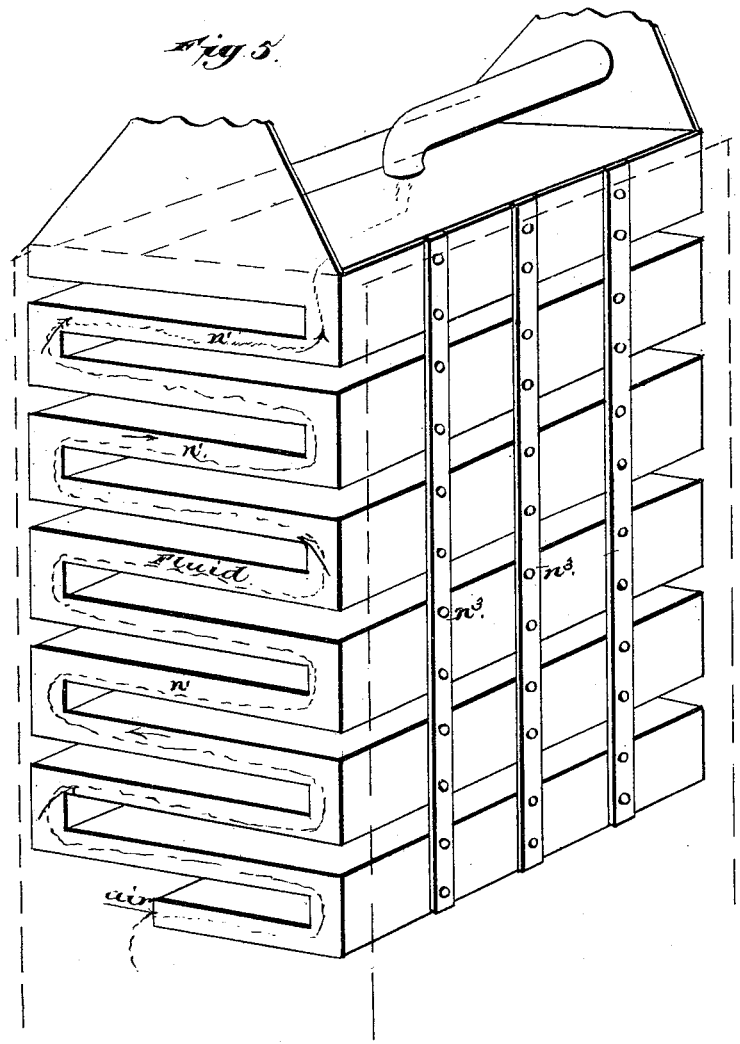
Witnesses:
Charles S. Hyer
James P. Freeman
Inventor.
Donald D. Cattanach
By ———— Marble
Atty.

UNITED STATES PATENT OFFICE.

DONALD D. CATTANACH, OF PROVIDENCE, RHODE ISLAND.

APPARATUS FOR THE MANUFACTURE AND DISTILLATION OF ALCOHOL, HYDROCARBONS, AND ACETIC ACID, AND FOR AGING AND REFINING LIQUORS.

SPECIFICATION forming part of Letters Patent No. 326,716, dated September 22, 1885.

Application filed June 5, 1885. (No model.)

*To all whom it may concern:*

Be it known that I, DONALD D. CATTANACH, a citizen of Great Britain, residing at Providence, in the county of Providence and State of Rhode Island, have invented certain new and useful Improvements in Apparatus for the Manufacture and Distillation of Alcohol, Hydrocarbons, and Acetic Acid, and for Aging and Refining Liquors, of which the following is a specification, reference being had therein to the accompanying drawings.

My invention relates to an apparatus for the manufacture and distillation of alcohol, hydrocarbons, and acetic acid, and for aging and refining liquors; and it consists in the construction and arrangement of the parts hereinafter particularly described, and pointed out in the claims.

Heretofore alcohol and other spirits have been distilled by the action of heat, by steam, and by steam and air commingled in apparatuses constructed, arranged, and adapted especially therefor. Such apparatuses have been but partially successful in accomplishing desired results for various reasons, are expensive, and do not and cannot produce such qualities of alcohols and other spirits as required for many purposes.

By my construction of a distilling apparatus I use the combined physical and chemical properties of atmospheric air, or its combination with oxygen, or of oxygen in a current in closed vessels in contact with the fluid to be distilled, and the vapors arising therefrom agitating and minutely dividing said fluid, and acting as a medium for conveying the said vapors to a suitable condenser or condensers, and as a means of purifying and oxidizing the same in one continuous operation of the apparatus.

The object of my invention is to provide an apparatus by which alcohols and other spirits of any required degree of purity may be cheaply produced at any and all times, is simple in construction, easy of management, readily understood, economical in use, and certain in its results.

The essential feature of my invention is the use of pure dry heated air in closed vessels in contact with the vapor arising from the material or fluids to be distilled, which vapors are generated by the heat conveyed to said vessels by said heated air and thereby imparted to said material or fluids.

In carrying out my invention I first pass atmospheric air through a vessel filled with lime-water; thence through a vessel filled with lumps of pumice-stone previously saturated with sulphuric acid; thence to a heating-box, where it is raised to the required temperature, and thence to and through the distilling apparatus proper. By so doing it will be seen I obtain an agent for heating the material or fluid to be distilled and for separating the spirits therefrom cleansed of all impurities and freed from all deleterious and noxious substances and odors, quick, penetrating, and efficient in its action. By the use of my apparatus I have found that the deleterious substances and noxious odors resident in or arising from the materials or fluids treated are entirely removed from the spirits distilled, and the cost of distillation consequently materially reduced.

In carrying out my invention I prefer to use the apparatus illustrated in the accompanying drawings, forming a part of this specification, wherein like letters of reference refer to similar parts, and in which—

Figure 1 is an elevation of the air-heating apparatus, together with the suction-fan. Fig. 2 is a plan view of the same. Fig. 3 is a sectional elevation of the distilling and rectifying apparatus, and Fig. 4 is a detail section of the lower portion of the rectifying-cylinder, taken on line $x\ x$ of Fig. 3. Fig. 5 is a detail view of the fret-work of shelves.

The air, which may have been previously washed by passing it through lime water, both to catch any impurities which may be floating in the air and extract the carbonic acid, which retards the chemical action of the air upon the fluid to be distilled, is sucked into a pipe, A, having a bell-mouth, $a$. This pipe is connected with and extends into the central lower portion of a cylinder, B, having a dome, B'. This cylinder is filled with lumps of pumice-stone, which are saturated with sulphuric acid, so that the air, in passing through the mass of pumice-stone, becomes dried and more thoroughly purified. In the bottom of this cylinder B is secured a pipe, $b$, having a valve, b', for the purpose of drawing off any of the sulphuric acid which by gravity may have collected in the bottom of said cylinder.

From the top of dome B' a pipe, C, extends to a heating-chamber, E, thus taking the purified air and passing it directly into contact with a heating-surface. This heating-chamber E is provided with a coil of pipe, E', which is supported by and passes through holes or apertures cut in a series of vertical plates, $E^2$, arranged alternately, so that the air entering from pipe C will pass down under the edge of one and up over the edge of the other, and so continue to circulate over these plates until the whole series will have been traversed. Lying between and resting on the sections of the coil of pipes E' is a series of copper-wire nets, e, through which the air passes, thereby acquiring a greater amount of heat in a given time.

Situated at a suitable distance from the said heating-chamber is a furnace, F, for the purpose of heating the air which is drawn into the coil in said furnace by means of the suction-fan H through the pipe 1. The air is heated at this point in the coil F', as said coil is situated over a furnace, $F^2$, of suitable construction, and then carried by pipe 2 from the top of furnace F to the coil of pipe E' in the heating-chamber E. The heated air circulates through the coil E, returning back and forth through the fan H by pipe 3 and the coil F' of furnace F. Said fan H continues to draw a fresh supply from the atmosphere until a current is established, so that the said current of air under pressure will at all times circulate rapidly through the coils in the furnace F and the heating-chamber E. To ascertain when a sufficient current under pressure has been established in these coils, the valve h is opened, and when it is found that a sufficient pressure has been established it is immediately closed, and also the valve through which the external air is sucked.

The purified air entering the chamber E through pipe C is circulated through the said heating-chamber and allowed to become heated sufficiently, when the air is sucked or drawn through pipe G into the suction-fan J, through which it passes, and out through the short pipe I, until it meets a branch pipe, M, where it is divided, a portion of the current passing to the top of a rectifier, N, and a portion through pipe L to the lower part of said rectifier. The portion passing through pipe M enters the rectifier near its top, and passes into a chamber formed by the outer jacket. The portion passing through pipe L enters the lower part of the rectifier by means of two pipes, $P^3$ $P^3$, connecting with pipes l l branching from pipe L, said pipes $P^3$ $P^3$ entering the deflectors l' l', which are curved and have closed ends, as illustrated in Fig. 4, and after passing through these deflectors impinges downwardly against the bottom and sides of the rectifier, and there meets the paddles of fans 7 and 8, which are revolved at a high rate of speed by suitable means, for purposes which will be hereinafter described. If the air leaving the chamber E, Fig. 1, is found to be of too high a temperature through the medium of the thermometer K, situated on the pipe I, leading from the fan J, the valve 4 of pipe D, which leads from the top of the air-purifying cylinder B, is opened and allows the cold purified air to be drawn in by fan J and meet the heated current passing through pipe G, reducing its temperature to the required degree.

The fan H is kept in continuous motion while the process of distillation is going on, so that the air may be continuously circulated in the coils in the furnace and heating-chamber, thereby restoring the amount of caloric that has been absorbed by the mash in the rectifier N, the returning pipe o o taking the air back from the jacket of the rectifier to the heating-chamber.

By having the heating-chamber and furnace separated one from the other any contamination of the purified air in the heating-chamber through a leakage in the pipes in the furnace is prevented, the vapors of the furnace escaping through the flues thereof.

The pipes entering the rectifier have suitable valves, $y'$, $y^2$, and $y^3$, which may be used when necessary to regulate the flow from or toward the rectifier N. This rectifier may be constructed of any suitable material, with a metal lining suitably coated with a metal which will not be deleterious to the process of rectification. The bottom of the rectifier is provided with the two fans 7 and 8, which are revolved in opposite directions at a high rate of speed by power applied on the outside of the rectifier. These fans, taking the air which comes in through the deflectors l' l', throw it into a high state of circulation. This rectifier is constructed of a fret-work of shelves of suitable material, $n'$, Fig. 5, being supported by small T-girders $n^2$, and the whole series being supported in the rectifier by suitable extensions, $n^3$, from the sides thereof, which are so arranged as not to interfere with the upward flow of the heated current of air or the downward flow of the material undergoing the process of distillation.

Situated at a suitable distance is a receiving-vat, X, Fig. 3, which is constructed of such material as is customarily used. This vat has a coil of pipe therein, which is traversed by a current of heated air under pressure, which enters the said coil by means of pipe L, which connects with pipe $P^3$ $P^3$, which enters one branch, l, of the divided pipe L, running into the rectifier N, the supply to the coil in the vat being regulated by suitable valves. In the upper portion, near the top of this vat, is placed a wire-gauze sieve, C', on which the mash falls before entering the main body of the vat X. The object of this sieve is to free the mash from any fibrous substances or solids. This sieve can be taken out and cleaned, being arranged in vertical slides.

On the top of the tank or vat X is placed a condenser or trap having a suitable cock, C, and having a bell-mouthed pipe extending into the upper part of the vat. This pipe allows the spirits which may arise from the mash to be condensed and fall back again into the mash. When the drawing of the mash from vat X begins, the cock in the condenser or trap on the top of said vat is opened to allow the air to flow in. To the bottom of the tank X a pipe, $H^2$, is connected, which has a valve, $X'$, said pipe connecting with another pipe, $H^3$, which runs into the bottom of a chamber, 12, this pipe also having a valve, $h^3$.

As many chambers like chamber 12 may be used as are necessary to the more perfect distillation of the material operated upon, but in the drawings forming a part of this specification only three chambers are shown. The chamber 12 may be constructed of any suitable material, and has an internal chamber, V. The chamber 12 is cylindrical in form, and has a suitable gage, $y^2$, on one side and a thermometer, $y^3$, on the other, so that the height of the fluid and the temperature of the chamber may be readily ascertained during the process of distillation. The cylinder 12 is provided with a suitable cap or dome, to which the top of cylinder V is secured, the bottom of said cylinder V being held in position by a pipe, $y$, which connects with a condenser, $V'$.

A pipe, W, connects with the top of the inside cylinder or chamber, V, which leads to a refrigerating-condenser, Z, said pipe W having suitable cocks and cut-off valves and a a pipe, $W'$, leading to the coil in vat X.

To the top of chamber V a second pipe, U, is connected, which runs to the next chamber, 11, of the series of these chambers.

To the uppermost part of the top of the inside cylinder, 12, a pipe, $I^2$, having a valve, $i$, is connected, which runs to a small condensing-chamber, $I^3$. To the opposite side of this chamber 12 a pipe, $H^4$, having a valve, $h^4$, is connected, but below the connection of pipe $I^2$. This pipe extends downward and connects with a pipe, $X^2$, having a valve, $x^2$, which runs from the lower part of the chamber 12 to the next chamber, 11, of the series, entering the bottom thereof.

The chambers 11 and 10, next in order, as represented, have gages $y^4$ $y^6$ and thermometers $y^7$ and $y^8$, and, situated on opposite sides of the chambers, pipes $I^4$ and $I^6$, having valves $i^4$ and $i^6$, are connected thereto, which run to small condensing-chambers $I^5$ and $I^7$. These chambers 11 and 10 are also provided with flow-pipes $H^5$ and $H^6$, having valves $h^5$ and $h^6$. These pipes connect with pipes $X^3$ and $X^4$, having valves $x^3$ and $x^4$, extending from the bottom of the said chambers, the pipes $H^5$ and $H^6$ connecting with pipes $X^3$ and $X^4$ just ahead of the valves $x^3$ and $x^4$. The pipe $X^3$ connects the bottoms of the chambers 11 and 10 together, but the pipe $X^4$, with nozzle 6, runs into the top portion, P, of the rectifier N, allowing the mash passing through these cylinders and their connecting-pipes to be released by the pipe $X^4$ and to come in contact with the top of the fret-work of shelves. The chambers 11 and 10 are also provided with distinct internal chambers T and R, the chamber T being connected with chamber R by the pipe S, and the chamber R by pipe Q with the top of flue P of the rectifier N. The bottoms of these chambers T and R are connected with small condensing-chambers $T'$ and $R'$ by means of pipes $t$ and $r$. In these pipes $y$, $t$, and $r$ are situated suitable gages, $V^2$, $T^2$, and $R^2$, which designate the height of the condensed spirit or aqueous fluid remaining in the bottoms of said chambers, so that the fluid that remains does not rise to a level with the bell-mouths $u$, $s$, and $q$ of the pipes U, S, and Q, which extend down to near the bottoms of these chambers. The top portion of these inside chambers are provided with small thermometers $u'$, $s^2$, and $q'$, by which the temperature of the said internal chambers is ascertained.

As heretofore described, the chamber T is connected with the chamber V by pipe U, and this chamber V has also a pipe, W, with a suitable test-cock, $w$, connected therewith, which runs to a refrigerating condensing-chamber, Z, connecting with a condensing-flue, $Z'$, situated therein. This flue $Z'$ is constructed of a series of inclined plates joined at their edges, and is surrounded by any suitable cooling-mixture which will produce a rapid condensation of the heated spirits passing through the same. This refrigerator Z is connected with a receiving-tank, $A'$, by a pipe, $z$, which in turn is connected with a tank, $B^2$, containing distilled water, this receiving-tank $A'$ and distilled-water tank $B^2$ also being provided with an escape-pipe, $C^2$.

To the lower portion of the side of the refrigerator Z a pipe, $Z^2$, having a valve, $z^2$, connects, whereby the cooling condensers $I^3$, $V'$, $I^5$, $T'$, $I^7$, and $R'$ form a continuous series, being connected by the pipes $z^3 z^3$, as illustrated, the said pipes $z^3$ connecting the top of one chamber with the bottom of the other, and so on until the whole series are joined. In the last of these series of small condensers an outlet-pipe, $z^4$, may be placed to convey the surplus cooling-fluid to some suitable trap or receptacle. By this connection of the series just described a continual flow of the cooling-mixture is kept up, surrounding the small coils situated in said condensers. To the bottom of each of these condensers a pipe, $z^5$, connects, running to the small coils in each condenser, said pipes containing cocks $z^6$ and valves $z^7$. The whole series of these pipes is connected to a pipe, 14, which eventually runs into a receiving-tank, $F^2$, said tank being supplied with a small condenser or trap, $f^2$, and a cock, $f^3$. Into the top of this tank also run pipes $A^2$ and $J^3$, having valves $a'$ and $j^3$, respectively. The pipe $A^2$ connects with the receiving-tank $A'$, and the pipe $J^3$ with the bottom of the rectifier N, the said pipe $J^3$ having a cock, $j^4$, situated at its extreme end. From the bottom of the rectifier N a pipe, $J^2$, having a valve, $j^5$, connects with the tank $E^2$, which has a suitable drain-cock, $e^2$. From the bottom of this tank $E^2$ a pipe, $E^3$, having a valve, $e^3$, runs to a pump, $D^2$, where it is connected to a pipe, $G^2$, which runs back and enters the top of the vat X.

From the bottom of the tank $F^2$ a pipe, $F^3$, having a valve, $f^4$, connects also with the pump $D^2$, where it connects with a pipe, $K^2$, which runs to the top of a second vat, $L^2$, which is also provided with sieves and a trap, $B^3$. This vat is connected with pipe $H^3$, having a valve, $h^3$, which connects to the bottom portion of the chamber 12 by a pipe, $L^3$, having a valve $l^3$.

The pipes $E^3$ and $F^3$, running to pump $D^2$, connect with passages in the said pump by means which are well-known in the art, the contents of one of the said pipes being pumped into its vat, to which its branch leads, at one operation, the valve in the one or the other of the pipes being closed when found desirable.

Oxygen or oxygenized air may be used in connection with any of the rectifying or acidifying processes herein described, and when it is used a connection is made with the valve $s'$ in pipe $P'$ from a gas bag or reservoir under pressure. The oxygen enters pipe P, which connects with both of the deflectors $l'$ $l'$ of the rectifier N. When the oxygen reaches this point, it may pass into the rectifier through the deflectors in a pure state, or it may be commingled with the pure heated air entering through the pipe L.

Having described the manner of generating the heated current of air under pressure and its course through the chambers, the operation of my improved still will be as follows: The current of pure heated air under pressure having been forced up through the rectifier and through the inside chambers, R T V, by means of the connecting-pipes thereof, will pass into the inner chambers and out through the valve W, all other sources of exit being previously cut off. By this means the chambers 10, 11, and 12 become of almost equal temperature, no cooling material having been brought in contact therewith. The mash having been previously placed in the vat X by suitable means, runs down through pipe $H^2$, the valve $x'$ having been opened in said pipe, into pipe $H^3$, through the valve $h^3$, in through the bottom of the chamber 12, around the inner chamber, V, and is allowed to continue to flow into chamber 12 until it reaches a level above the point where pipe $H^4$ enters said chamber, when valve $h^3$ is closed. When this charge of the mash has become heated to a suitable degree, allowing what spirituous and aqueous vapors may arise to escape through the pipe $I^2$ into a condenser, $b$, the valve $x^2$ of pipe $X^2$ is opened, and the mash is allowed to flow through the bottom of the second chamber until it reaches an equal level in both chambers, when the valve $x^2$ is closed and valve $h^3$ again opened, and the mash flowing in through said valve again raises the liquid to a level above the mouth of pipe $H^4$, when valve $h^3$ is again closed. When this second charge has been sufficiently heated, the valve $x^2$ is again opened and a portion of the heated mash in chamber 12 again allowed to flow into chamber 11, said valve being closed when a sufficient amount of the mash has flowed into said chamber. Valve $h^3$ is now opened again, raising the mash already in chamber 12 to the level before stated. The chambers 12 and 11 will now both contain quantities of the mash undergoing the heating process. The valve $x^3$ is closed and valve $x^2$ is opened, allowing the chamber 11 to be again supplied with the mash, from chamber 12, and when a quantity of the material has run from this chamber into chamber 11 the valve $x^2$ is closed and chamber 12 again charged with another supply of the mash by opening the valve $h^3$, after which said valve is closed. Valve $x^3$ is again opened, allowing part of the charge in chamber 11 to flow into chamber 10, when said valve is again closed. This process continues, the mash gravitating from one chamber to the other, and so on throughout the series of chambers until they are all filled above the level of the top flow-pipes, $H^4$, $H^5$, and $H^6$, which will be indicated by the gages on the sides of the chambers. The temperature of the mash in the last chamber, 10, will be of an even temperature with the heated current of air in and ascending up through the rectifier, about 190° to 195° Fahrenheit, gradually decreasing in the other chambers until the last one will be about the temperature of the mash in the vat X. By this intermittent process of filling the chambers as desired I attain the temperature proper in each chamber before any material has been admitted into the rectifier and brought into contact with the hot air. During this process of gravitating the liquid from one chamber to the other the spirit from the mash, as it becomes warmer, will be generated and allowed to flow out of the top of the chambers into the pipes which lead to condensers, where it will be collected. When the temperature is found to be regulated to the proper degree, the valve $h^6$ is opened, as are also the valves $h^3$, $h^4$, and $h^5$, allowing a regulated continuous flow of the mash from the vat X through the chambers and out into the rectifier, the flow into said chambers being equal to the outflow of the mash into the said rectifier. The material or mash contained in the last chamber flows out through pipe $H^6$ into a branch pipe, 6, and from thence onto the top surface of the series of fret-work of shelves in the rectifier N. The spirit which may arise from the mash which is now continuously flowing through the chambers 12, 11, and 10 ascends and enters the pipes which lead to the supplementary condensing-chambers, where it is liquefied and remains and is afterward collected. The mash flowing out of pipe 6 as stated above comes in contact with the plates of the fret-work of shelves in the rectifier N and with the current of heated air, and as said mash strikes the top of said shelves more or less spirit will be distilled from the mash, in consequence of the regulated degree of temperature of said shelves and air, and be carried up the flue P of the rectifier by the ascending current of air. The mash then flows through said shelves as indicated by the arrows in Fig. 5, and the spirit which may arise from the same is taken up by and ascends with the current of air which presses upon and passes through the descending mash. The mash continues to descend the shelves until it reaches the last of the series of shelves, where it falls down into contact with the blades of the oppositely-revolving fans and is dashed into spray and mingled thoroughly with the ascending current of hot air. The spirit which may still be left in the mash is taken up by the ascending current of hot air into the flue P of the rectifier. The heavier or remaining portion of the mash falls into the bottom of the rectifier, from whence, if it is found to still contain any spiritous vapors, it is drawn off by pipe $J^2$ into a tank, $E^2$, from whence it can run into a pump, $D^2$, by pipe $E^3$, and pumped up by pipe $G^2$ into the vat X, and again go through the distilling-chambers. Should the residuum be found to contain no more spirit through the medium of the test-pipe $J^3$ and cock $j^4$, it is drawn off at this point and allowed to run into a suitable waste-receptacle. The spirits which have been collected by the heated current of purified air will now be distilled by fractional distillation, being taken up into the flue P of the rectifier N, passing up through said flue into a pipe, Q, connected with the top of said flue, and then flowing through said pipe down through the central portion of the inside of the heating-chamber R, said current being caused to impinge against the bottom and sides of said chamber R by the flared mouth $q$ of the pipe Q. On striking this bottom surface a portion of the aqueous and spirituous vapors is condensed. The current then passes upward out through pipe S, connected to the top of chamber R, allowing the current to flow through said pipe into chamber T, being there also impinged against its bottom by a flared or bell-mouthed pipe, S. This last chamber is of a lower degree of temperature, and more of the spirituous vapor will be condensed and remain in its bottom. The current continues to flow through suitable pipes connecting a series of these condensing-chambers until it will have reached the last of said series, being allowed to flow by the pipe U, as represented in the drawings, and enters this last chamber in the same manner as those above described, depositing the spirits which may be condensed. When the current of heated air, which is still forced onward and depositing by condensation a portion of the spirits in each inner condensing-chamber, reaches the last of the series of chambers, the portion which has not been thus far condensed ascends again to the top of the last chamber, and entering a pipe, W, connected with said chamber, passes in through the coil in vat X into a refrigerating-condenser, Z. The air carrying the aqueous and spirituous vapors, on passing through the flue $Z'$ of this condenser, the remaining spirit will be condensed and pass into a receiving-tank, $A'$, the air passing out of this tank $A'$ down to a tank, $B^2$, of distilled water, where, if any spirituous vapors should still be carried along with the air, it is taken up by the distilled water kept at a low temperature by suitable means, the air escaping through a pipe in the top of the tank $C^2$. All of the mash to be distilled having been passed through the series of chambers, around the inner heating-chambers, and through the rectifier N, and the heated air having carried the vapors back, causing them to be condensed in the condensers described, said condensed spirits may be collected separately from the supplementary condensing-chambers, situated under and connected with the distilling-chambers, by means of cocks attached to pipes running from the bottom of the several condensers.

When the atmosphere is at or about its maximum temperature, no additional heat is required. Under these circumstances the furnaces and fan H are not used, but air is drawn in at the temperature of the atmosphere by fan J through pipe D, and the process is carried on in all other points exactly as above described, except that a longer time is required to complete the distillation.

In rectifying the spirit as it is condensed and falls into the supplementary condensers it runs out in a pipe, 14, connected to the series of condensers, which pipe connects with the tank $F^2$. The condensed spirit in the receiving-tank $A'$ is also run into tank $F^2$ through pipe $A^2$, connecting these tanks. When all of the condensed spirits have been collected in this tank $F^2$, for the purpose of rectification, it is run into a pump, $D^2$, through a pipe, $F^3$, and from this pump it is drawn up through a pipe, $K^2$, into the vat $L^2$. When all of the distilled spirits have been pumped into the vat $L^2$ through a pipe, $K^2$, it is allowed to run into the series of distilling-chambers 12, 11, and 10 and onto the surface of the fret-work of shelves in the rectifier, which are kept at a regulated temperature, then passing downward onto the paddles as before, and the finer spirits taken back into the inner condensing-chambers by the ascending current of heated air and condensed, and eventually carried into the refrigerating-condenser Z.

The process of rectifying is accomplished in the same manner as when the mash is first distilled, except that the distillate passes uninterruptedly through the chambers, whose valves have all been opened, except the valve $x^4$ of chamber 10, the same being again collected and pumped into the vat $L^2$, the same operation being again pursued and being repeated as often as it is necessary to do so, until the spirits shall have attained a highly-rectified state and been rendered free from all impurities and imperfections.

In the distillation or refining of hydrocarbons the crude oil is first placed in the vat X and goes through the distilling-chambers in a manner similar to the distilling of alcohol above described. As the refined spirit is condensed in the heating-chambers R T V it is collected into the small condensers, and also that part of the refined vapor which ascends through the top of the outside cylinders, 10, 11, and 12 into the condensing-chambers or traps connected therewith. The condensed vapor in the supplementary condensers, as also that which has passed through the refrigerating-condenser into the receiving-tank, is run into the tank $F^2$, where it runs into the pump $D^2$ and is forced back to the vat X, whereby it may undergo the same process, this being repeated until the crude oil has been highly refined and fractionally collected.

In the manufacture of acetic acid dilute alcohol is run into the vat X. The distilled water in the tank $B^2$, that may contain a portion of the alcoholic vapors from the first-described process, can be utilized by bringing it to the required strength by the addition of spirits or water. This dilute alcohol is then pumped into vat X, and the valves $x'$ $h^3$ $h^4$ $h^5$ $h^6$, in fact all the valves connecting these chambers 12 11 10, except valve $x^4$, are thrown open, when the dilute alcohol will rapidly fill said chambers, and passing through them will flow out through the pipe $H^6$ into branch pipe 6 into the rectifier N. On flowing into the rectifier the fluid strikes the top portion of the fret-work of shelves, as in the processes heretofore described, passing down said shelves, and while flowing downward is met by a current of air at a regulated temperature, the air being brought into active motion by the revolving blades of fans 7 and 8, and ascends upward as described. The fluid after leaving the shelves meets the action of the blades, and is converted into minute particles of spray, thereby being brought into a more minute division and mingled with the air, and the oxidation commences and is continued until all of the fluid is converted into acid. While the dilute alcohol has been passing through the chambers, which are heated by means heretofore described, the aqueous and spirituous vapors which may have risen are carried out into the condensers connected with the outside chambers. The aqueous and spirituous vapors formed in the rectifier, which are carried along by and in contact with the current of air at a regulated temperature and under pressure, are passed up through flue P, as heretofore described, and are partially condensed in the inner chambers, R T V, the uncondensed portion passing along into pipe W, in through the coil of pipe in the vat X, from thence passes through pipe $y$ to the condenser Z into tank A, from whence they run into the tank $F^2$ by the pipe $A^2$. The current of air continues through the top of tank $A'$ into the tank $B^2$, which has been replenished with a new supply of distilled or pure water kept at a low temperature, the said water absorbing any alcoholic vapors which may be still carried by the current of air, and the air itself escaping through the pipe $C^2$ thereof. The alcoholic fluid that falls to the bottom of the rectifier N is permitted to flow to the tank $F^2$, as are also the condensed vapors which will be collected in the supplementary condensers connected to the inner chambers, R, T, and V, and to the outer chambers, 12, 11, and 10. This alcoholic fluid which is accumulated from the rectifier and the various condensing-chambers is allowed to remain in the tank $F^2$ until all of the first charge of dilute alcohol has flowed out of the vat X. When the last portion of the first charge has left the vat X, the valve $x^4$ is thrown open, and at the same time the pump $D^2$ is set in motion and allowed to force up into the vat X the accumulated alcoholic fluid in tank $F^2$, which flows down behind the first charge into the first chamber 12, this operation of pumping and recharging the vat X being now continuous until the whole charge is converted into acid. The connections of the condensers are all thrown open, so as to connect the same with the pipes leading to tank $F^2$, as is also the valve in the bottom of the rectifier. This last process continues uninterruptedly until all the aqueous and spirituous vapors have been carried off by the heated current of air under pressure, and the portion of the same which are condensed being carried back to the tank $F^2$ by the pipes connecting said condensers and the said tank.

In concentrating this fluid after the oxidation is complete the chambers are filled with the acetic acid in a manner heretofore described, the outflowing valves being closed and a current of heated air passed through the inner chambers and out through pipe W and through cock $w$ into the air or through suitable connections back to the heating-chamber E. This acid remains in these chambers and becomes heated so that vapors will pass therefrom and be condensed by the small condensers and collected separately. Thus the acetic acid is concentrated and its aqueous parts and the per cent. of acid carried by them are allowed to pass off and are collected in the supplementary condensers, from whence they may be drawn off and utilized in a subsequent process. When free oxygen is used, the pipe $s'$ $s'$ is connected with a gas-tank containing the oxygen. The valve $y^2$ is closed to prevent the entrance of air, and the valve $y'$ in pipe $P'$ $P'$ is opened to permit the passage of the oxygen to the rectifier. The valve $x^9$ is opened to permit the passage of oxygen, and the valve $x^8$ is closed to prevent the escape of the same. The valves $w$ in pipe W, $l^3$ in pipe $L^3$, and $j^2$ are closed. The closing of the valves necessary for the change from the use of air to that of oxygen having been effected, the process will be as follows: The alcoholic fluid which has been placed in the vat X is permitted to flow down and fill the outer chambers, 12, 11, and 10, as heretofore described. The paddles 7 and 8 and the fan P² are set in motion. The valve s' s' is opened and the oxygen allowed to flow in under pressure. It is forced by the action of the fan P² and the paddles 7 and 8 through, the rectifier N, and from thence through the chambers R, T, and V, and then to the condenser Z and other parts of the apparatus through their connections, returning to the rectifier N by way of the pipe P'. When a current has been established, the valve $h^6$ is opened and the fluid is allowed to pass to the rectifier N through the pipe 6, where it comes in contact with the current of oxygen. The fluid passes down over the fret-work of shelves in contact with the oxygen in motion, meeting, as it descends, the action of the paddles 7 and 8, by which it is brought into a state of minute division and mingled thoroughly with the oxygen. The fluid then passes out from the bottom of the rectifier N through J³, thence into tank F², thence by the action of the pump D², which is kept in motion, back to the vat X, thence into the chambers 12, 11, and 10, as before. If at any time the heat generated by the action of the oxygen upon the alcoholic fluid becomes too great, the valve $y^3$ of pipe M is opened, and a current of cold air is forced through the jacket of the rectifier N, to reduce the temperature to the required degree, the condenser Z and supplementary condensers aiding in reducing the said temperature. This process continues until a perfect acidification of the alcoholic fluid is obtained, when said acid will be drawn off by suitable means.

I make no claim to the process of distillation or rectification as herein described, the same being the subject of an application filed March 27, 1885, and of which this is a division, nor to the process of manufacturing acetic acid, as I intend to make such process the subject of a future application.

Having thus described my invention, what I claim as new, and desire to secure by Letters Patent, is—

1. In a distilling apparatus, the combination of an air-purifying cylinder, a heating-chamber connected therewith, furnace for heating said chamber, and a fan for sucking the air from the heating-chamber and forcing it in a divided current into the upper and lower portions of a rectifier, substantially as described.

2. In a distilling apparatus, the combination of a purifying-cylinder containing pumice-stone saturated with sulphuric acid, a heating-chamber connected with said cylinder containing a coil of pipe, the furnace for heating said chamber separate and apart therefrom, a fan to cause the air to circulate through the heating-chambers and the furnace, suitable connections for these several parts, and a fan for sucking the heated air from said heating-chamber, and means, as described, for forcing it in a divided current into the upper and lower portions of a rectifier, substantially as described.

3. In a distilling apparatus, the combination, with an air-purifying cylinder, and a furnace having a suitable fan, of a heating-chamber having a coil of pipe therein, alternate vertical partitions extending partially across the chamber, and supporting the pipe composing the coil, and horizontal layers of gauze lying between the pipes, whereby the air can be thoroughly heated, substantially as described.

4. In a distilling apparatus, the combination, with an air-purifying cylinder and heating-furnace, of a heating-chamber containing a coil of pipe and connected to the heating-furnace, a pipe leading from the said heating-chamber and connecting with a cold-air pipe regulated by a suitable valve, and a fan for sucking and forcing the ameliorated air in a divided current into the upper and lower portions of a rectifier, substantially as described.

5. In a distilling apparatus, the combination, with an air-purifying cylinder, a heating-chamber, and a furnace, of a rectifier suitably connected to said heating-chamber, curved deflectors in the bottom thereof, and a series of fret-work shelves surrounded by a suitable casing or jacket, substantially as described.

6. In a distilling apparatus, the combination of a rectifier, a series of chambers containing inner chambers, supplementary condensers connected with said inner and outer chambers, a main condenser, pipes, and valves connecting said parts, and feeding-vats and receiving-tanks arranged substantially as described, and for the purposes specified.

7. In a distilling apparatus, the combination of a series of cylindrical chambers having inner fractional distilling-chambers distinct from said outer chambers, a rectifier connected with said inner and outer chambers, and suitable air heating and pressure mechanism connected with the rectifier, whereby the air under pressure is forced through the rectifier and the inner chambers, substantially as described, and for the purposes specified.

8. In a distilling apparatus, the combination, with a series of inner and outer chambers, of the supplementary condensing-chambers connected to said inner and outer chambers, as set forth, having suitable cocks and valves, a main condenser having a condensing-flue therein, and suitable connecting pipes and valves attached to said parts, whereby the condensed vapors in each condenser are collected separately, substantially as described.

9. In a distilling apparatus, the combination, with a series of distilling-chambers provided with level-gages and thermometers, of inflow-pipes connected to the bottom of said chambers and outflow-pipes connected to the upper portion thereof, pipes connecting the inner chambers with the rectifier and main condensing-chamber, the supplementary condensers attached to said chambers, and the receiving-tanks which collect the condensed vapors, substantially as described.

10. The combination of the vat X, the distilling-chambers, the rectifier $m$, the receiving-tanks, and means, as set forth, by which the liquor is returned to the vat X for further rectification.

11. The combination of the pipes whereby oxygen is admitted into the apparatus and conducted to the rectifier, agitating devices in the rectifier, means whereby the descending fluid is exposed in a finely-divided state to the action of the oxidizing agent, and means, as described, whereby the temperature of the fluid is regulated, all substantially as described.

In testimony whereof I affix my signature in presence of two witnesses.

DONALD D. CATTANACH.

Witnesses:
D. B. COOPER,
VAN LEER POLK.